US010259756B2

(12) United States Patent
Danforth et al.

(10) Patent No.: US 10,259,756 B2
(45) Date of Patent: Apr. 16, 2019

(54) SOLID PROPELLANT WITH INTEGRAL ELECTRODES, AND METHOD

(71) Applicant: Raytheon Company, Waltham, MA (US)

(72) Inventors: Jeremy C. Danforth, Tucson, AZ (US); Matt H. Summers, Marana, AZ (US); David G. Garrett, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 356 days.

(21) Appl. No.: 15/057,510

(22) Filed: Mar. 1, 2016

(65) Prior Publication Data
US 2017/0253536 A1   Sep. 7, 2017

(51) Int. Cl.
| C06B 21/00 | (2006.01) |
| B05B 7/22 | (2006.01) |
| F02C 3/28 | (2006.01) |
| F02K 9/08 | (2006.01) |
| F02K 9/28 | (2006.01) |
| F02K 9/94 | (2006.01) |
| F02K 9/95 | (2006.01) |

(52) U.S. Cl.
CPC ............ *C06B 21/0075* (2013.01); *B05B 7/22* (2013.01); *F02C 3/28* (2013.01); *F02K 9/08* (2013.01); *F02K 9/28* (2013.01); *F02K 9/94* (2013.01); *F02K 9/95* (2013.01); *F05D 2230/31* (2013.01)

(58) Field of Classification Search
None
See application file for complete search history.

(56) References Cited

U.S. PATENT DOCUMENTS

| 3,358,453 A | 12/1967 | Swet |
| 3,806,064 A | 4/1974 | Parilla |
| 4,085,584 A | 4/1978 | Jones et al. |
| 4,128,441 A | 12/1978 | Cucksee et al. |
| 4,597,811 A | 7/1986 | Ducote |

(Continued)

FOREIGN PATENT DOCUMENTS

EP   2 921 285 A1   9/2015

OTHER PUBLICATIONS

Jones, "Hybrid Rocket Engines Use Additive Manufacturing to Combine the Advantages of Solid and Liquid Propellants", Oct. 15, 2010, pp. 1-3, retrieved from the Internet: http://www.stratasys.com/resources/case-studies/aerospace/rocket-crafters [retrieved on Feb. 24, 2016].

(Continued)

*Primary Examiner* — Reginald S Tillman, Jr.
(74) *Attorney, Agent, or Firm* — Renner, Otto, Boisselle & Sklar, LLP

(57) ABSTRACT

A device may include an electrically-operated propellant or energetic gas-generating material, additively manufactured together with electrodes for producing a reaction in the material. The device may also include a casing that is additively manufactured with the other components. The additive manufacturing may be accomplished by extruding or otherwise depositing raw materials for the different components where desired. The electrodes may be made of a conductive polymer material, for example using an electrically-conductive fill in a polymer.

13 Claims, 1 Drawing Sheet

(56) References Cited

U.S. PATENT DOCUMENTS

| | | |
|---|---|---|
| 4,776,993 A | 10/1988 | Chang et al. |
| 4,792,423 A | 12/1988 | Craig et al. |
| 5,119,627 A | 6/1992 | Bradford et al. |
| 5,600,946 A | 2/1997 | Dombrowski et al. |
| 6,183,574 B1 | 2/2001 | Warren |
| 6,499,287 B1 | 12/2002 | Taylor |
| 7,540,145 B2 | 6/2009 | Rutan |
| 8,601,790 B2 | 12/2013 | Fuller |
| 8,857,338 B2 * | 10/2014 | Sawka ............ F02K 9/95 102/202 |
| 8,950,329 B2 | 2/2015 | Villarreal et al. |
| 9,138,981 B1 | 9/2015 | Hirsch et al. |
| 9,543,479 B2 | 1/2017 | Hermann |
| 2002/0113331 A1 | 8/2002 | Zhang et al. |
| 2006/0272754 A1 | 12/2006 | Dixon et al. |
| 2008/0092521 A1 | 4/2008 | Dulligan et al. |
| 2010/0294113 A1 | 11/2010 | McPherson |
| 2012/0311993 A1 | 12/2012 | Mihara et al. |
| 2013/0031888 A1 | 2/2013 | Fuller |
| 2014/0174313 A1 | 6/2014 | Villarreal et al. |
| 2014/0259895 A1 | 9/2014 | Mason |
| 2014/0361460 A1 | 12/2014 | Mark |
| 2015/0054200 A1 | 2/2015 | Fruth |
| 2015/0307385 A1 | 10/2015 | Klein et al. |
| 2015/0322892 A1 | 11/2015 | Whitmore et al. |
| 2016/0185039 A1 | 6/2016 | Carbone et al. |
| 2016/0251486 A1 | 9/2016 | Cernohous et al. |
| 2017/0157845 A1 | 6/2017 | Bihari et al. |
| 2017/0218228 A1 | 8/2017 | Jose et al. |
| 2017/0253537 A1 | 9/2017 | Danforth et al. |
| 2018/0044257 A1 | 2/2018 | Summers et al. |

OTHER PUBLICATIONS

International Search Report and Written Opinion for corresponding International Application No. PCT/US2016/056378 dated Jan. 20, 2017.

* cited by examiner

SOLID PROPELLANT WITH INTEGRAL ELECTRODES, AND METHOD

FIELD OF THE INVENTION

The invention relates to solid propellant materials and elements, and methods of producing solid propellant elements.

DESCRIPTION OF THE RELATED ART

Solid propellant elements may be made by methods such as casting or molding. However such methods are limited in the shapes that can be obtained. In addition, it may be difficult to obtain uniformity in properties for a cast or molded solid propellant element. Triggering reaction in such elements may also present problems.

SUMMARY OF THE INVENTION

A solid propellant element that includes an electrically-operated propellant material is made using an additive manufacturing process, such as extrusion. Electrodes for activating the propellant are made as part of the same additive manufacturing process.

According to an aspect of the invention, a method of making a gas-producing device includes: in a single additive manufacturing process: forming electrodes; and forming electrically-controlled solid propellant material in contact with and operatively coupled to the electrodes.

According to another aspect of the invention, a gas-producing device includes: electrodes; and electrically-controlled solid propellant material in contact with and between the electrodes. The electrodes and the electrically-controlled solid propellant material are additively manufactured together as a single unit.

According to an embodiment of the method of any paragraph(s) of this summary, the single additive manufacturing process further includes forming a casing around the electrodes and the electrically-controlled solid propellant material.

According to an embodiment of the method of any paragraph(s) of this summary, the method includes inserting the electrodes and the electrically-controlled solid propellant material into a pre-formed casing.

According to an embodiment of the method of any paragraph(s) of this summary, the forming the electrically-controlled solid propellant material includes forming the electrically-controlled solid propellant materials between adjacent pairs of electrodes.

According to an embodiment of the method of any paragraph(s) of this summary, the forming the electrodes includes forming multiple adjacent pairs of electrodes; and forming the electrically-controlled solid propellant material includes forming the electrically-controlled solid propellant materials between the adjacent pairs of electrodes.

According to an embodiment of the method of any paragraph(s) of this summary, the forming the electrodes includes forming multiple plate electrodes with the electrically-controlled solid propellant material between adjacent of the plate electrodes.

According to an embodiment of the method of any paragraph(s) of this summary, the plate electrodes are parallel to one another.

According to an embodiment of the method of any paragraph(s) of this summary, the forming the electrodes includes forming multiple annular electrodes with the electrically-controlled solid propellant material between adjacent of the annular electrodes.

According to an embodiment of the method of any paragraph(s) of this summary, the forming the electrodes includes extruding electrically-conductive material; and the forming the electrically-controlled solid propellant material includes extruding the electrically-controlled solid propellant material.

According to an embodiment of the method of any paragraph(s) of this summary, the electrically-conductive material is an electrically-conductive polymer material.

According to an embodiment of the method of any paragraph(s) of this summary, the electrically-conductive polymer material includes a conductive material fill, such as conductive fibers and/or conductive powder.

According to an embodiment of the method of any paragraph(s) of this summary, the extruding of the electrically-conductive material and the extruding the electrically-controlled solid propellant material includes extruding from separate respective nozzles.

According to an embodiment of the method of any paragraph(s) of this summary, the additive manufacturing includes building up the device layer by layer, placing the electrically-controlled solid propellant material and electrically-conductive electrode material for one layer before moving on to a next layer.

According to an embodiment of the device of any paragraph(s) of this summary, the electrodes include plate electrodes; and adjacent surfaces of the plate electrodes are parallel to one another.

According to an embodiment of the device of any paragraph(s) of this summary, the electrodes are made of a conductive polymer material.

According to an embodiment of the device of any paragraph(s) of this summary, the electrodes are separated radially from one another, with an inner electrode surrounded by an outer electrode; and the electrically-controlled solid propellant material is annular, between the inner electrode and the outer electrode.

According to an embodiment of the device of any paragraph(s) of this summary, the device includes a casing that is additively manufactured with the electrodes and the electrically-controlled solid propellant material, as part of the single unit.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A device may include an electrically-operated propellant or energetic gas-generating material, additively manufactured together with electrodes for producing a reaction in the material. The device may also include a casing that is additively manufactured with the other components. The additive manufacturing may be accomplished by extruding or otherwise depositing raw materials for the different components where desired. The electrodes may be made of a conductive polymer material, for example using an electrically-conductive fill in a polymer.

Figure 1:
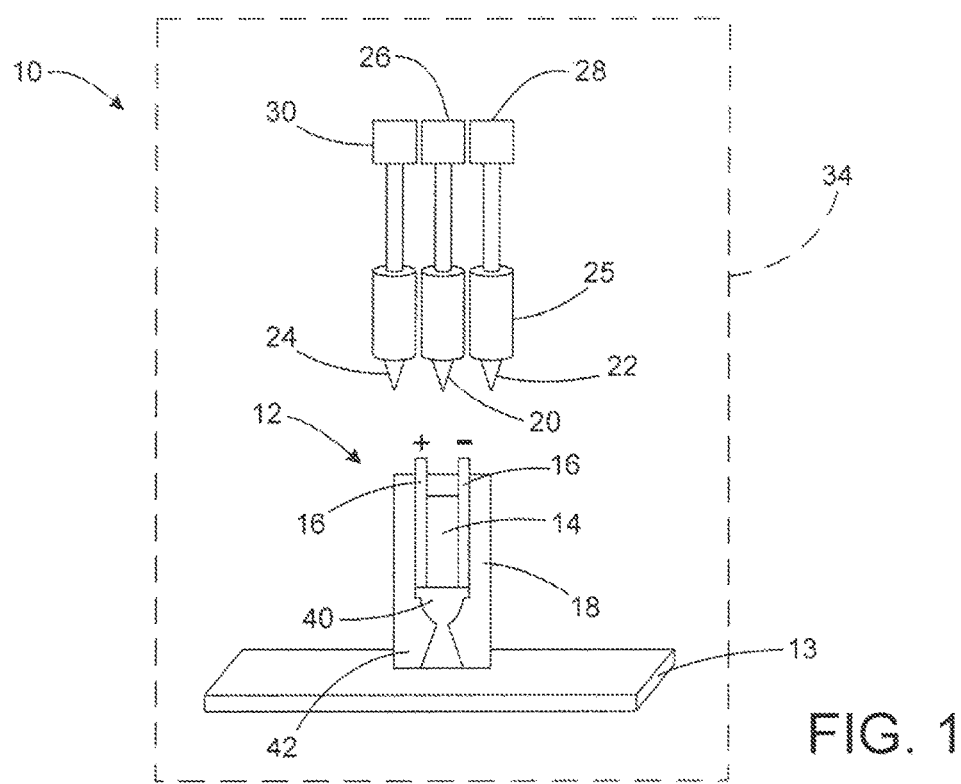
FIG. 1 is a side view of an additive manufacturing system used for making a gas-generating device, according to an embodiment of the invention.

FIG. 1 shows a system 10 used for printing or otherwise additively manufacturing a gas-producing device 12. The device 12 is additively manufactured layer by layer on a platform or bed 13. The device 12 includes a propellant or gas-producing energetic material or propellant material 14, electrodes 16 that are operatively coupled to the energetic material 14, and a casing 18 around the energetic material 14 and the electrodes 16. The components 14-18 are laid down using respective nozzles 20, 22, and 24, in a print head 25. The nozzles 20-24 are used for extruding or otherwise depositing material for the components 14-18 of the device 12. Raw materials for the components 14-18 may be stored in reservoirs 26, 28, and 30 that are operatively coupled to supply materials to the respective nozzles 20-24. The additive manufacturing process is carried out in a chamber 34, which may be a heated chamber.

The propellant material 14 may be any of a variety of materials that burn to produce pressurized gases, and that is ignited by using the electrodes 16. One class of propellant materials are materials that produce an electrically-activated (or electrically operated) solid propellant. Examples of such materials may be found in U.S. Patent Publication 2014/0174313 A1, which is incorporated herein by reference in its entirety. As described in that publication, a source material for making an electrically-operated solid propellant may include an oxidizer, a fuel, and a binder. The oxidizer may be a liquid-based perchlorate oxidizer that includes aluminum perchlorate, barium perchlorate, calcium perchlorate, lithium perchlorate, magnesium perchlorate, perchlorate acid, strontium perchlorate, and/or sodium perchlorate, to give a few examples. The fuel may be a metal-based fuel, for example including tungsten, magnesium, copper oxide, copper, titanium, and/or aluminum. The binder may include casein, methyl cellulose, polyethylene oxide, polyvinyl acetate, and/or polyvinyl alcohol.

The electrically operated propellant ignites with the application of electricity (from the electrodes 16) and correspondingly extinguishes with the cessation of electricity, even when exposed to high pressures, though below a high pressure threshold. For example, when exposed to ambient or high pressures within the casing 18, such as atmospheric pressure, pressures greater than 200 psi, 500 psi, 1000 psi, 1500 psi and up to 2000 psi, the electrically operated propellant is extinguished with the interruption of electricity (e.g., voltage or current) applied across the electrically operated propellant. In other words, without application of electricity, the combustion of the electrically operated propellant is not self-sustaining at high pressures, such as high pressures of 200 psi or more and less than 2000 psi. Thus, the electrically operated propellant is configured for "on" and "off" operation under the described variety of conditions.

The oxidizer may be an aqueous solution, with the oxidizer material dissolved in water and/or glycerol. It has been found that controlling the amount of water and/or glycerol in the extruded material is important in additive manufacture of the propellant material 14. Too much solvent in the printed mixture can cause problems with curing the extruded material and having the extruded material properly maintain its shape. Too little solvent can result in problems with the material adhering to other material layers.

The raw propellant material that is used to additively manufacture the propellant material 14 may have any of a variety of other suitable formulations. Broadly, the raw propellant material may include a fuel, a solvent (e.g., water and/or glycerol), an oxidizer, and a binder. The fuel and the oxidizer are the chemically-active components that react with one another to produce the pressurized gases. The solvent receives the fuel and other components, to allow mixing together of the components into a flowable material. The binder aids in maintaining the raw material as a unified material that can be cured and/or dried into a solid mass.

The nozzles 20-24 may have different configurations from one another, and may require different treatments of their respective materials. For example, the nozzles 20-24 may have different diameters and different flow feed mechanisms (such as different rates of feeding raw material) in order to extrude the different materials layer by layer in order to produce the device 12. Thus deposition of the materials from different of the nozzles 20-24 may take different amounts of time to deposit a portion of material, and/or may deposit differently-sized portions of material. Different controllers and/or control algorithms may be used to control the different nozzles 20-24, in order to achieve the desired deposition of material in various locations. For instance, software and/or firmware for controlling the movement of the nozzles 20-24, and for controlling the supply of various raw materials to the nozzles 20-24, may be configured with software and/or firmware that takes into account the differences in operation of different of the nozzles 20-24.

The nozzles 20-24 may move together as a single unit, such as the print head 25, with supply of material to one or more of the nozzles 20-24 at various locations being used to deposit the different materials where needed. Alternatively one or more of the nozzles 20-24 may be moved separately from the others, with for example the nozzle 20-24 successively moved individually to deposit the different types of material in succession, to successively build up a single layer of the device 12.

To aid in controlling the content of water and/or glycerol (or other solvent) in the extruded material, the energetic material nozzle 20 may be heated to a higher temperature than that in the general environment of the chamber 34. The nozzle 20 may be heated to a temperature that is at least that of the boiling point of the solvent (such as glycerol and/or water) that is in the raw propellant material, but is below a temperature at which the raw propellant material decomposes. The decomposition may involve a heat-producing chemical reaction. This allows for removal of solvent material while still preserving the capability of the extruded material to function as a propellant (to later undergo the chemical reaction between the fuel and the oxidizer that produces propellant products such as pressurized gases). In addition, chemical reaction of the fuel and the oxidizer during the manufacturing process is undesirable in that it produces heat and combustion products, which can damage the manufacturing system.

The energetic material nozzle 20 may be heated by any of a variety of suitable mechanisms. For instance, the nozzle 20 may be electrically heated, with the electrical heating perhaps controlled by a feedback mechanism, to control the temperature of the nozzle 20.

The heated nozzle 20 may have an opening, though which the raw material 16 is extruded, that has a diameter of from 0.3 mm to 0.7 mm. Other suitable sizes and/or shapes for an opening may also be used. The addition of extra water and/or glycerol (extra solvent) in the raw propellant material 16 aids in preventing jamming of material in the heated nozzle 20 during the additive manufacturing (extruding) process.

The electrodes 16 may be made of any of a variety of electrically conductive materials. One suitable material may be a conductive polymer material. This may be a polymer material that includes a conductive material fill, such as electrically-conductive powder or electrically-conductive fibers. The fill material may include carbon and/or graphene powders or fibers. Other possible fill materials may be metal powders or other electrically conductive materials, preferably with a melting point that is greater than an extrusion temperature.

The conductive material may also be an extrudable or solid metal, for example copper wire surrounded by a plastic sheath. The material is passed through a heated nozzle (or other dispenser), which melts the plastic sheath, while leaving the metal in solid form. A cutting device may then be used to separate a portion of the metal and melted sheath at a desired location within the device 12. Cut bits of metal may come into electrical conduct with one another, to allow the electrodes 16 to be produced using this process. Further details regarding such a process may be found in U.S. Patent Pub. 2014/0361460 A1, the figures and detailed description of which are incorporated by reference.

The casing 18 may be made of any of a variety of structural polymer materials that can be produced as part of the additive manufacturing process, for example a material that can be extruded from the nozzle 24. Such a structural material desirably has properties, such as strength, sufficiently to hold pressure during the active combustion process, when nominal pressures may be from 2,000,000-35,000,000 Pa (300-5000 psi), for example. It may be desirable to avoid pores or voids in such a structural polymer material.

Alternatively the casing 18 may be additively manufactured at least in part from a suitable non-polymer material, such as a metal. An electrical insulator may be used to electrically insulate a metal casing from the electrodes.

The casing 18 or other parts of the device 12 may be configured to facilitate flow of the gasses produced by combustion of the gas-generating material 14. For example, the casing 18 may be configured to have a combustion chamber 40 wherein combustion occurs, and where the pressurized gasses flow away from the propellant material 14. The casing 18 may also include a nozzle 42 through which the pressurized gasses exit the device 12.

As another alternative, some or all of the various components of the device 12 may be additively manufactured by processes other than the extrusion described above. For example, the propellant material 14 could be cast, such as being poured or extruded into a desired shape, with already-formed electrodes 16 of a desired configuration then put in place, such as by a pick-and-place process, where the electrodes are driven down into the propellant material 14, at least partially submerging the electrodes 16 in the propellant material 14.

As noted above, the chamber 34 itself may be operated at an elevated temperature (a temperature above the ambient temperature outside of the chamber 34). The chamber 34 may also have a controlled atmosphere within it, for example to prevent reactions with the elevated temperature propellant material. In addition, the platform or bed 13 may have an elevated, controlled temperature. The heating of the chamber 34 and/or the bed 13 may be done to help prevent or reduce thermal gradients in the extruded propellant material. Such thermal gradients may cause warping in the finished propellant element. For example, the chamber 34 and the bed 13 both may be maintained at a temperature from 30 degrees C. to 90 degrees C.

Various devices may be used to move raw material from the reservoirs 26-30 to the respective nozzles 20-24 in controlled ways. For instance pistons moved by stepper motors, which may be controlled by suitable controllers, may be used to dispense the components of the device 12 where desired. The component materials 14-18 may be placed in dollops or amounts of on the order of 0.1 mm in extent (in all directions), for example with each layer of the device 12 having a similar thickness. The heated nozzles 20-24 and the bed 13 may move relative to one another in order to position the nozzles 20-24 where the extruded material is to be deposited over the bed 13.

The components of the device 12 may be deposited in a semi-cured (partially cured) state as it is extruded from the nozzles 20-24. After extrusion, some further curing of the device 12 may occurring within the chamber 34, during and/or after deposition of additional layers of the device 12, and/or after removal of the device 12 from the chamber 34. For example, further curing may occur in an oven or other elevated temperature environment that is outside of the chamber 34

Figure 2:
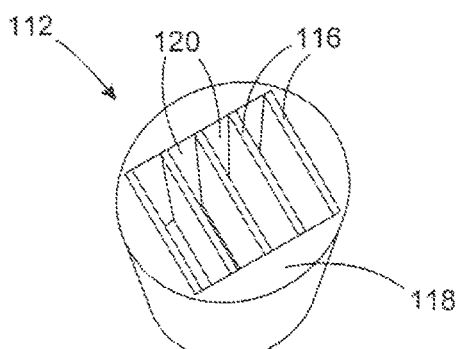
FIG. 2 is an oblique view of a gas-generating device, according to an embodiment of the invention.
Figure 3:
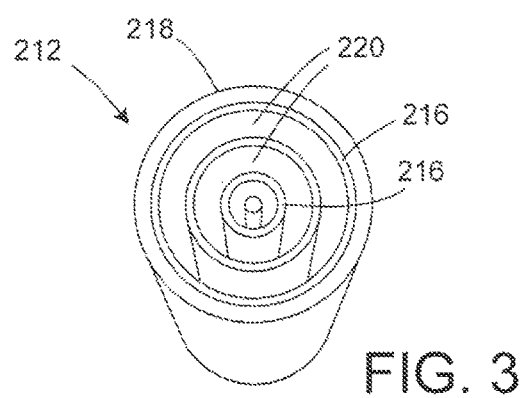
FIG. 3 is an oblique view of a gas-generating device, according to another embodiment of the invention.

FIGS. 2 and 3 show two possible configurations of electrodes for the device. FIG. 2 shows a device 112 with a series of plate electrodes 116 that are surrounded by a casing 118. Spaces 120 between adjacent of the electrodes 116 are shown as empty for illustration purposes, but would in an actual device receive propellant (energetic material). The propellant or energetic material in the spaces 120, between adjacent of the electrodes 116, would be ignited by putting electrical power across the adjacent of the electrodes 120.

The plate electrodes 116 may be substantially parallel to one another, being set as close to parallel as possible within tolerances and limits. Alternatively there may be some small angle between surfaces of the electrodes 116, for example causing the propellant material to preferentially burn first where the distance between adjacent of the electrodes is smaller. This sloping of the electrodes 116 may be any direction, for example in a longitudinal direction along the device 112 of perpendicular to that direction. The sloping of electrode surfaces may be accomplished by sloping the electrodes themselves, or by varying the thicknesses of individual of the electrodes 116. The angling of the electrodes 116 may facilitate more complete burning of the propellant between the angled electrodes.

FIG. 3 shows a cylindrical device 212 that has a series of annular electrodes 216, surrounded by an annular casing 218. For illustration purposes there are empty spaces 220 between the electrodes 216, but in an actual device spaces 220 would be filled with an electrically-operated propellant (energetic material), additively manufactured with the electrodes 216 as described above. Similar to the device 112

(FIG. 2), the spaces 220 may have a width that is constant (or substantially constant) in their longitudinal and radial directions, or may have a thickness that varies in one or both of those directions, in order to preferentially activate some parts of the energetic material.

The electrode arrangements shown in FIGS. 2 and 3 are only two examples of many types of suitable arrangements for electrodes. Various numbers and placement of electrodes are possible. For example, the electrode arrangement may include electrodes in concentric circles, parallel plates, or a grid-like array of plates.

Whatever the arrangement of the electrodes, there may be electrical leads between the electrodes and a power source, such as a battery, that is used for providing power to active the propellant material. The electrical power source may be coupled to a suitable control system for providing electrical power to the electrodes when burning of the propellant or energetic material is desired.

Figure 4:
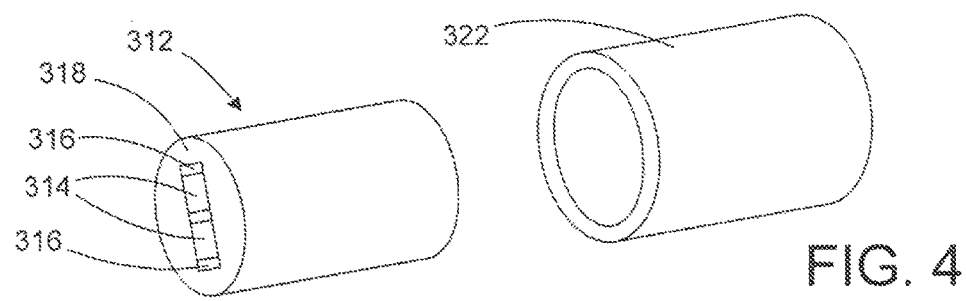
FIG. 4 is an exploded view showing a gas-generating device according to yet another embodiment of the invention.

FIG. 4 shows another alternate configuration, in which an additively-manufactured device 312, with electrodes 316 and electrically-activated propellant 314, is placed in a separately-produced casing 322. The casing 322 may be a metal casing, produced by a method such as cast or molding, or another suitable method. The device 312 may have an insulating layer 318 around the propellant 314 and the electrodes 316, although the insulating layer 318 may be omitted if desired. The casing 322 may have holes (not shown) through which pass lead wires (not shown) between the electrodes 316 and electrical power source such as a battery.

In the illustrated embodiment the separate casing 322 is cylindrical, although the casing and the device that is dropped into it may be any of a variety of suitable shapes. In addition, the device 312 may alternatively be dropped into a suitable hole in a larger structure, such as a fuselage, for use as a thruster or other gas-producing device.

The devices described above may be used as a gas-generation device or system for generating combustion gases, such as for purposes of propelling a munition, and for example a projectile. It will of course be appreciated that the gas generation system may be used to provide propulsion for any projectile, such as a missile, bomb, smart bomb, supply container, to give a few examples. The gas-generation system or device may be used as a main thruster, or as a divert thruster. The gas-generation system may alternatively be used for other purposes, such as to drive a turbine, to operate a pressure driven mechanical device, to provide tank gas pressurization, or to provide pressurized gas to operate an actuator to move a part, to give just a few examples.

The devices provide many advantages, including the ability to construct a device with multiple components in a single integrated manufacturing process. Also a wider variety of geometries can be obtained than can be done with other (conventional) processes. For example, laying down the electrodes and the propellant together in a single additive process may allow geometries of electrodes that are placed within the propellant material in complex ways.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of making a gas-producing device, the method comprising:
   in a single additive manufacturing process:
      forming electrodes; and
      forming electrically-controlled solid propellant material in contact with and operatively coupled to the electrodes.

2. The method of claim 1, wherein the single additive manufacturing process further includes forming a casing around the electrodes and the electrically-controlled solid propellant material.

3. The method of claim 1, further comprising inserting the electrodes and the electrically-controlled solid propellant material into a pre-formed casing.

4. The method of claim 1, wherein the forming the electrically-controlled solid propellant material includes forming the electrically-controlled solid propellant materials between adjacent pairs of electrodes.

5. The method of claim 1,
   wherein the forming the electrodes includes forming multiple adjacent pairs of electrodes; and
   wherein the forming the electrically-controlled solid propellant material includes forming the electrically-controlled solid propellant materials between the adjacent pairs of electrodes.

6. The method of claim 1, wherein the forming the electrodes includes forming multiple plate electrodes with the electrically-controlled solid propellant material between adjacent of the plate electrodes.

7. The method of claim 6, wherein the plate electrodes are parallel to one another.

8. The method of claim 1, wherein the forming the electrodes includes forming multiple annular electrodes with the electrically-controlled solid propellant material between adjacent of the annular electrodes.

9. The method of claim 1,
   wherein the forming the electrodes includes extruding electrically-conductive material; and
   wherein the forming the electrically-controlled solid propellant material includes extruding the electrically-controlled solid propellant material.

10. The method of claim 9, wherein the electrically-conductive material is an electrically-conductive polymer material.

11. The method of claim 10, wherein the electrically-conductive polymer material includes a conductive material fill, such as conductive fibers and/or conductive powder.

12. The method of claim 10, wherein the extruding of the electrically-conductive material and the extruding the electrically-controlled solid propellant material includes extruding from separate respective nozzles.

13. The method of claim 1, wherein the additive manufacturing includes building up the device layer by layer, placing the electrically-controlled solid propellant material and electrically-conductive electrode material for one layer before moving on to a next layer.

\* \* \* \* \*